Aug. 16, 1960 P. FROST 2,949,070
EXPOSURE CONTROL DEVICE FOR PHOTOGRAPHIC CAMERAS
Filed Feb. 25, 1958
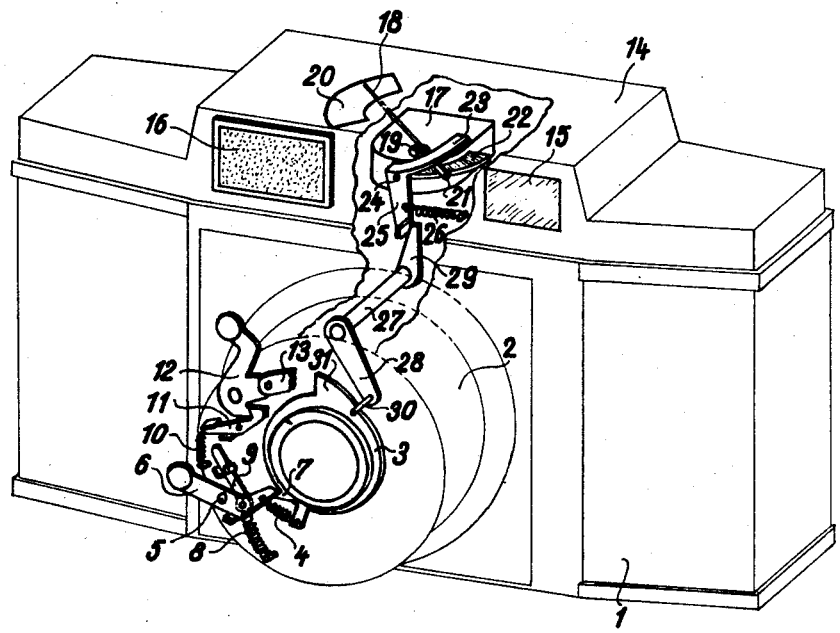
INVENTOR.
Paul Frost
BY
Connolly and Hutz
THEIR ATTORNEYS

United States Patent Office 2,949,070
Patented Aug. 16, 1960

2,949,070

EXPOSURE CONTROL DEVICE FOR PHOTOGRAPHIC CAMERAS

Paul Frost, Munich, Germany, assignor to Agfa Aktiengesellschaft, Leverkusen-Bayerwerk, Germany, a corporation of Germany Filed Feb. 25, 1958, Ser. No. 717,348

Claims priority, application Germany Feb. 28, 1957

6 Claims. (Cl. 95—10)

This invention relates to an exposure-regulating device for photographic cameras which has a sensing element operatively associated with its galvanometer indicator, and more particularly relates to such a device in which the sensing element is operatively connected with an exposure-regulating element of the camera.

Heretofore-known automatic exposure control devices of this general type have suffered from the disadvantage of being rather bulky and, accordingly, requiring a comparatively large space within the camera body. These known devices are too large and bulky for incorporation within the body of a small picture camera, particularly within the small casing of a miniature or 35 mm. camera.

An object of this invention is, therefore, to provide a simple and economical automatic exposure-regulating device for photographic cameras which is compact enough to be easily incorporated within the body of a relatively small picture camera.

In accordance with this invention, a sensing device operatively associated with a photoelectric exposure meter incorporating a galvanometer is mounted within the body of the camera adjacent the lens tube. This sensing device is connected to an exposure-regulating element, for example to a diaphragm-adjusting element, by means of a shaft which is rotatably mounted about an axis disposed parallel to the axis of the lens tube. This shaft extends from the sensing device within the body of the camera to the diaphragm-adjusting element which is mounted upon the lens tube. A particularly advantageous arrangement is provided by disposing the photoelectric exposure meter and galvanometer under the top of the camera casing where the viewer is usually located and by mounting the shaft within the lens tube itself.

A cam and follower means may be advantageously used to connect the sensing device with the diaphragm-adjusting element. In this arrangement a follower element is connected to the end of the shaft and rides against a cam element associated with the diaphragm-adjusting element which is, for example, a diaphragm-adjusting ring.

The sensing device for detecting the position of the movable galvanometer indicator at predetermined moments may be advantageously constructed and arranged to be infinitely variable. This sensing device may also advantageously include an element which supports the movable galvanometer indicator against excessive movement when it is contacted.

Novel features and advantages of the present invention will become apparent to one skilled in the art from a reading of the following description in conjunction with the accompanying single figure of drawing which is a perspective view of one embodiment of this invention.

In the drawing, a small photographic camera, for example, of the 35 mm. or miniature type includes a casing 1. A lens tube 2 extends from the casing and, for example, includes a central shutter (not shown) and an adjustable diaphragm for the lens opening (also not shown). An exposure-regulating element, for example, a diaphragm-adjusting element 3, for example, in the form of a ring 3 is mounted upon lens tube 2 at a location remote from casing 1. A tension spring 4 connects a projection on diaphragm ring 3 with release lever 6 which is rotatably mounted upon the lens tube 2 by pin 5. In the cocked or neutral position, a portion of release lever 6 contacts a projection 7 of diaphragm-adjusting ring 3.

A resilient means 8, for example tension spring 8, reacts upon release lever 6 in a direction to urge diaphragm-adjusting ring 3 towards one extremity of travel, for example, in that direction providing the largest aperture opening of the lens diaphragm.

A connecting linkage, for example, including a sliding link 9 is operatively associated with release lever 6. Sliding link 9 is also operatively associated with a portion of the shutter actuating means, for example, with locking lever 11 which is spring loaded by tension spring 10 to arrest shutter-winding or cocking lever 12 in the tensioned position. Shutter-cocking lever 12 is under the tensioning influence of the main driving spring of the shutter (not shown) and is connected with the shutter mechanism (not shown) by the coupling link 13 (partially shown).

A photoelectric cell 16 and galvanometer 17 of an automatic exposure-regulating device are mounted within the body of the camera adjacent lens tube 2. These elements are, for example, positioned under the upper portion 14 of the camera casing 1 within which view finder 15 is mounted together with other elements (not specifically shown). The movable element 18 of galvanometer 17, for example, a pointer 18, is rotatably mounted upon a pivot 19 with a portion visible through a window 20 in the upper portion 14 of casing 1. End 21 of pointer 18 is angular in cross section, for example, having a square cross section and is movably mounted between legs 22 and 23 which comprise a sensing device. Leg 22 is, for example, utilized as a supporting element for preventing excessive force being transmitted to pointer 18, and is accordingly disposed, for example, under the arc-shaped path of movement of square end 21 of pointer 18. Curved leg 23 is disposed on the other side of the path of travel of pointer 18, for example, above it. Leg 23 is rotatably mounted about pivot 24 for example, supported within camera casing 1, and is constructed and arranged, for example, in a curved shape to sense the position of pointer 18 when it trips it against leg 22. Element 23 also includes a lever or extension 25 upon which tension spring 26 reacts. Spring 26 reacts, for example, from an anchoring point on casing 1 in a direction to influence sensing arm 23 to move away from the galvanometer pointer 18.

Sensing device or leg 23 is operatively coupled with diaphragm-adjusting ring 3 through a shaft 27 which is mounted with its axis of rotation disposed parallel to the axis of lens tube 2. Shaft 27, for example, is conveniently mounted within lens tube 2 to provide a compact and protected installation. Shaft 27, includes coupling means at both of its ends, for example, levers 28 and 29. Lever 28, is for example, operatively associated with diaphragm-adjusting ring 3 by means of a follower pin 30 which rides in contact with a cam or projecting element 31 incorporated in a diaphragm-adjusting ring 3. Lever 29 at the other end of shaft 27 bears against extension or lever arm 25 attached to sensing leg 23.

The exposure time-controlling device (not shown) for the shutter (also not shown) is connected, for example, with a variable electrical resistance incorporated within the photoelectric cell circuit. Another variable resistance is, for example, interposed within the photoelectric cell circuit to compensate for the varying sensitivities of different types of films used in the camera. An adjustable light-diffusing agent can also be positioned in front of the photoelectric cell to compensate for variations in film sensitivity.

Operation

After tensioning the shutter by adjusting cocking lever 12 to the position shown in the drawing, and after adjusting the exposure time of the shutter to a predetermined value; release lever 6 is manually rotated in the counterclockwise direction. Release lever 6 in its first phase of movement carries diaphragm-adjusting ring 3 along in contact with it as a result of the reaction of tension spring 4 between these parts. In this initial phase of movement diaphragm-adjusting ring 3 moves sensing element 23 clockwise around pivot 24 through a train of elements including cam 31, lever 28, shaft 27, and levers 29 and 25 until sensing leg 23 contacts square end 21 of galvanometer pointer 18 and arrests it between itself and stationary leg 22. This closes the diaphragm of the lens an amount which is a function of the position of galvanometer pointer 18; and photoelectric cell 16, accordingly, controls the angle at which sensing lever 23 is itself arrested by contact with pointer 18.

After galvanometer pointer 18 and the closing motion of diaphragm-adjusting ring 3 are simultaneously arrested, lever 6 moves away from the nose or projection 7 of diaphragm-adjusting ring 3 while diaphragm-adjusting ring 3 is maintained in the arrested position under the tension of spring 4. This further motion of lever 6 actuates sliding link 9 which rotates locking lever 11 in a clockwise direction to release shutter winding lever 12. This actuates the shutter (not shown) to operate in accordance with a predetermined set exposure time.

When lever 6 is released after the shutter has operated, it is returned to contact with projection 7 of ring 3 by the resilient reactions of springs 8 and 4, and spring 26 moves these parts to the neutral condition shown in the drawing in which the diaphragm of the lens is once more in the fully opened position.

What is claimed is:

1. A compact control device for automatically regulating the effective aperture of a photographic camera having a body and a lens tube in accordance with the ambient illumination as detected by a photoelectric exposure meter incorporating a movable galvanometer element, said control device comprising an exposure-regulating element mounted upon said lens tube, a sensing device mounted within said body adjacent said lens tube, said sensing device having a detecting element which is operatively associated with said movable galvanometer element for detecting its position at predetermined moments with a corresponding arrestment of said detecting element, an actuating means operatively associated with a shutter, a release lever, elastic means connecting said exposure-regulating element with said release lever in a manner which causes movement of said release lever to progressively reduce the exposure setting of said exposure-regulating element, a connecting linkage operatively associating said release lever with said actuating means, a coupling means operatively connecting said exposure-regulating element with said sensing device for arresting said progressive motion of said exposure-regulating element when said movable galvanometer element is detected and said detecting element is arrested to provide an exposure setting of said exposure-regulating element which is related to the detected position of said movable galvanometer element while said release lever continues its movement to trigger said actuating means, said coupling means including a shaft which is rotatably mounted about its own axis which is disposed parallel to the axis of said lens tube and extending from said exposure-regulating element to said sensing device, said photoelectric exposure meter and movable galvanometer element being disposed within an upper portion of said camera casing, said shaft being disposed within said lens tube, said exposure-regulating element including a cam element, a follower lever being connected to the end of said shaft disposed adjacent said exposure-regulating element, said follower lever being disposed in operative contact with said cam element, the end of said shaft remote from said exposure-regulating element being connected to a coupling lever which is operatively engaged with said detecting element of said sensing device, a resilient means connected to said detecting element for urging it in a direction to react upon said coupling lever and through said shaft to maintain said follower lever in forceful resilient contact with said cam element at all times thereby insuring the smooth transmission of forces between said exposure-regulating element and said sensing device.

2. A control device as set forth in claim 1 wherein said sensing device includes a stationary arcuate element disposed adjacent the path of travel of said galvanometer element and on the opposite side of said galvanometer element from said sensing device, and said stationary element is constructed and arranged to provide support for said galvanometer element when said detecting element of the sensing device clamps said pointer between itself and said stationary element.

3. A control device as set forth in claim 1 wherein said sensing device is rotatably mounted upon an axis disposed parallel to the axis of rotation of said shaft.

4. A control device as set forth in claim 3 wherein said movable galvanometer element is mounted to rotate about a vertical axis.

5. A compact control device as set forth in claim 1 wherein said follower lever incorporates a follower pin which bears upon said cam.

6. A compact control device as set forth in claim 1 wherein said exposure-regulating element is a diaphragm-adjusting ring.

References Cited in the file of this patent

UNITED STATES PATENTS

| 2,061,909 | Karg | Nov. 24, 1936 |
| 2,183,768 | Goldhammer | Dec. 19, 1939 |
| 2,188,820 | Riszdorfer | Jan. 30, 1940 |
| 2,206,626 | Blechner | July 2, 1940 |

FOREIGN PATENTS

| 667,821 | Germany | Nov. 21, 1938 |